Figure 1:
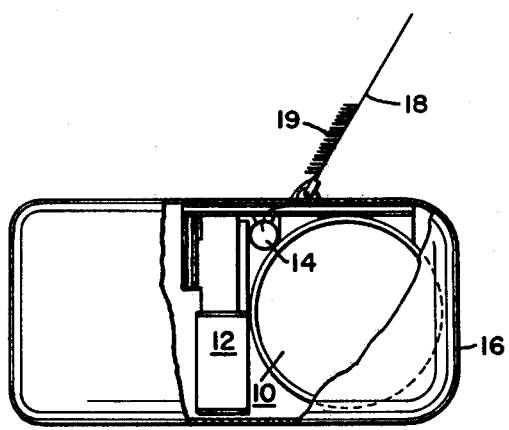

United States Patent [19]
Bouyoucos

[11] 3,978,940
[45] Sept. 7, 1976

[54] ACOUSTIC SOURCE
[75] Inventor: John V. Bouyoucos, Rochester, N.Y.
[73] Assignee: Hydroacoustics Inc., Rochester, N.Y.
[22] Filed: Mar. 10, 1975
[21] Appl. No.: 557,140

[52] U.S. Cl. .............................. 181/120; 340/8 R; 340/12 R; 340/17 R
[51] Int. Cl.[2] ...................... G01V 1/04; G01V 1/38; H04B 13/02
[58] Field of Search .................... 181/110, 119, 120; 310/8.2; 73/67.2; 340/14, 12 R, 8 MM, 388, 17 R, 8 LF, 8 PC, 8 R

[56] References Cited
UNITED STATES PATENTS
| | | | |
|---|---|---|---|
| 2,390,847 | 12/1945 | Olson | 340/8 MM |
| 3,219,970 | 11/1965 | Sims | 340/8 MM |
| 3,392,369 | 7/1968 | Dickie et al. | 181/120 |

OTHER PUBLICATIONS
Villchur, "Audio Engineering" Aug. 1952, p. 20.
Wallen et al., APPRES: A Very-Low Frequency Acoustic .... S1307-0050 Digest of Technical Papers of 1970 ... Sept. 1970.

*Primary Examiner*—Brooks H. Hunt
*Attorney, Agent, or Firm*—Martin Lukacher

[57] ABSTRACT

A broadband low frequency source suitable for deep sea applications without pressure compensation is disclosed. The source utilizes hydraulically powered flexural disc radiators which are sized to small fractions of the generated wavelength. Inertance is applied hydraulically to the radiators to effectively mass load the radiators, thus lowering the resonant frequency of the radiators to fall within the transmission band to minimize driving power requirements and provide for operation over a wide bandwidth.

20 Claims, 3 Drawing Figures

U.S. Patent  Sept. 7, 1976  Sheet 1 of 2  3,978,940

ACOUSTIC SOURCE

The invention herein described was made in the course of or under a contract with the U.S. Navy.

The present invention relates to acoustic generators, and particularly to acoustic sources which operate over a wide frequency band at low frequencies and at deep depths.

The invention is especially suitable for use as an acoustic transmitter, such as for underwater sound and sonar purposes. The invention may also be used in geophysical exploration as in underwater geographical surveys and geological studies.

The problems of generating controllable sound at significant power levels in the very low frequency range arise principally out of the dimensions of practically sized radiators which must be limited to small fractions of a wavelength, and also out of the need for operation at high ambient pressures, in underwater applications. For high power levels at low frequencies large volume velocities are required, generally of small radiators. Resonant structures usually in the form of stiff pistons with narrow bandwidths can achieve a high volume velocity with reasonable driving forces but only at or near the resonant frequency.

Wide bandwidth requirements at low frequencies without pressure compensation have not been satisfied with any known practical solution. For example, attempts at mass loading, with physical masses attached to stiff pistons, have resulted in increased driving power requirements as well as increases in the size and weight of the acoustic generator well beyond desirable proportions. Nevertheless stiff radiators are needed to withstand high ambient pressures and to avoid the need for complex pressure compensation means. It is a feature of this invention to retain the advantages of stiff radiators and simultaneously affore wide band operation at low acoustic frequencies.

The invention has the further feature of providing an acoustic source which produces both high driving forces and high volume velocities independent of the load. The invention further provides for the use of resonant structures in a manner to obtain wide bandwidth while permitting the power requirements to be minimized.

It is also a feature of this invention to facilitate the use of a stiff radiator, such as flexural disc radiating elements that can transmit high acoustic power to a surrounding liquid medium; the radiator being light in weight and strong enough to operate at high ambient pressures, as under water at great depths.

It is an object of this invention to provide an improved acoustic source especially adapted to operate as an underwater transmitter.

It is a further object of the present invention to provide an improved hydraulically operated acoustic generator.

It is a further object of the present invention to provide an improved underwater generator that is capable of operation to great depths without pressure compensation.

It is an object of the present invention to provide an improved, underwater acoustic apparatus which is simple, rugged, reliable and compact.

It is a further object of the present inventinon to provide an improved acoustic generator with high immunity to explosive shock.

It is an object of the present invention to provide an improved acoustic source which is essentially self-contained requiring only control and power circuits for remote operation.

Briefly described, the invention may be embodied in an acoustic transmitter having a radiating element such as a stiff piston radiator. A source of acoustic signals is hydraulically coupled to the radiator to provide acoustic pressure variations in pressurized fluid which drives the radiator at frequencies which may extend over a wide band, which at low acoustic power may be from 20 to 100 Hz. The acoustic signal source may be a hydraulic driver provided with a high acoustic source impedance. In this event the generated acoustic volume velocity will be largely independent of the load on the radiating element so as to drive it with high driving forces as required to produce high volume velocities over the desired wide band of frequencies. Means are located in the acoustic driving circuit, and are hydraulically coupled to the radiating element, for presenting an acoustic inertance to reduce the resonant frequency of the radiating element to the lower portion of the band of frequencies ot be transmitted; thus minimizing driving power requirements over the band. Specifically, a fluid filled chamber may be located adjacent a drive area on the radiator. This chamber is connected by a relatively lengthy fluid filled tube to a precharged gas accumulator. The inertance of the circuit provided by the tube acts on the radiator to provide the desired mass loading the place resonance at the desired frequency. By selecting properly the ratio of the drive area in the chamber to the area of the long fluid-filled tube, an impedance transformation can be obtained that makes the relatively light-weight fluid in the tube appear as a large mechanical mass insofar as the radiator is concerned. It is this large effective mass that is used to control the resonant frequency.

Figure 3:
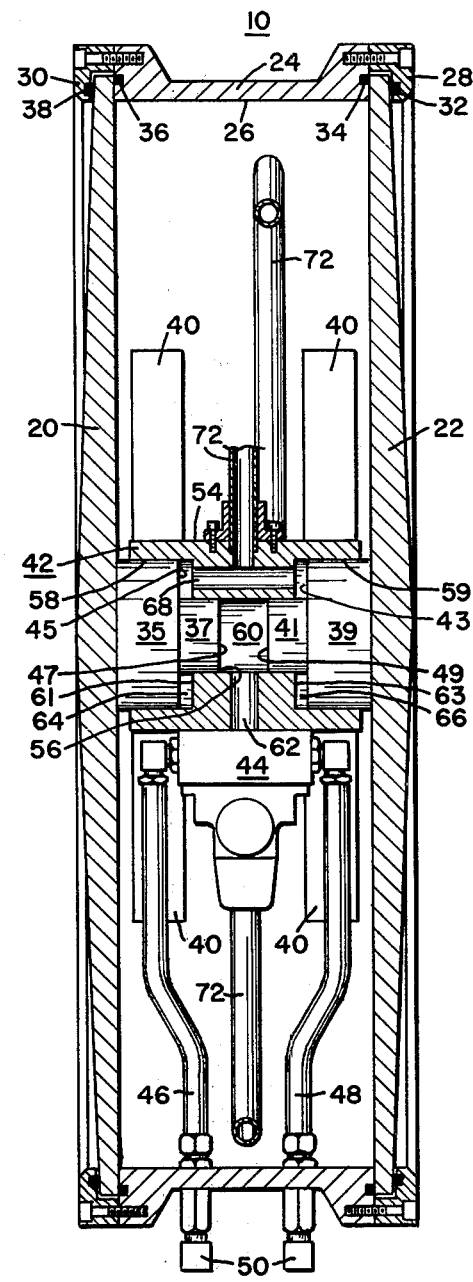
Figure 2:
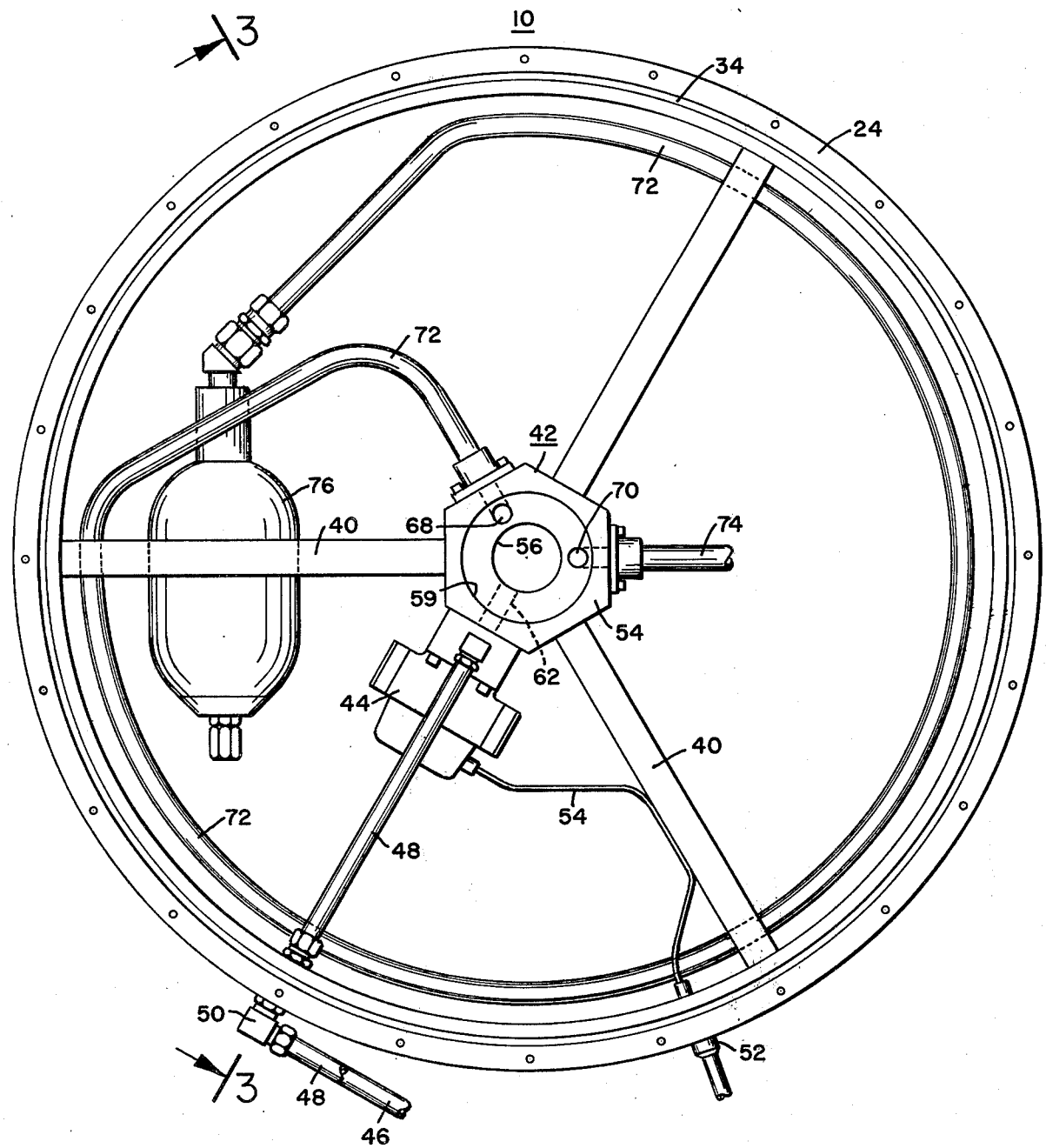

The invention itself, both as to its organization and method of operation, as well as additional objectives and avantages thereto, will become more readily apparent from a reading of the following description in connection with the accompanying drawings in which:

FIG. 1 is a front view of an acoustic transmitter system embodying the invention; the view being broken away to show the components thereof, FIG. 2 is an end view of the transducer in the system shown in FIG. 1 with one of the radiator discs removed to show the interior configuration of the transducer, and FIG. 3 is a sectional view of the transducer taken along line 3—3 in FIG. 2.

Referring to FIG. 1, a transducer 10, hydraulic power supply 12 and junction box 14 for electrical circuits are all shown located within a tow body structure 16. A cable 18 which may be faired as shown at 19 attaches the structure 16 to the towing craft. Electrical power and signals to be transmitted are carried by conduits in the cable 18 and are distributed via the junction box 14 to an electric motor driven pump in the power supply 12 and to an electromechanical driver in the transducer 10. The pump in the supply 12 provides pressurized hydraulic fluid (oil) which is applied to the transducer 10. The signals which are applied to the transducer 10 are amplified by a hydraulic valve amplifier within the transducer and transmitted through its radiating surfaces.

The transducer 10 shown in FIG. 1 is depicted in FIGS. 2 and 3. Two flexural disc radiators 20 and 22 are mounted back to back in an air filled cylindrical housing 24. A hydraulic driver 42 is also disposed in the housing 24. The rims of the discs 20 and 22 are clamped to a central cylinder 26 by rings 28 and 30 to afford flexural hinge supports for the discs 20 and 22. O-rings 32, 34, 36 and 38 internally seal the housing 24. The discs 20 and 22 are generally conical in shape. Their inner surfaces are flat. The outer surfaces are tapered being thinner at the rim and thicker at the center. Cylindrical driving posts or pistons 35, 37 and 39, 41 are coaxial with the discs 20 and 22, respectively, and may be integral therewith. The outer posts 35 and 39 have a larger diameter than the inner posts 37 and 41 and form steps 43 and 45 therebetween. These steps present areas to the driving fluid as do opposing ends 47 and 49 of the inner posts 37 and 41. These areas, particularly the step 43 and 45 areas, determined in large part the wide band operating characteristics of the transmitter as will be discussed in greater detail hereinafter.

A spider-leg assembly 40 is mounted within the cylindrical housing 24 to provide structural support for the hydraulic driver 42 to which is attached a hydraulic amplifier 44. Supply line 46 and return line 48 connect the hydraulic amplifier 44 in a closed circuit with the pump in the power supply 12 which supplies the pressurized fluid. The hydraulic lines enter the transducer housing 24 via hydraulic couplings 50. Electric signals for operating the amplifier 44 are brought into the housing 24 via a terminal 52. A conduit 54 for the signal lines extends from the terminal 52 to the amplifier 44.

The hydraulic amplifier 44, which may be similar to that shown in Bouyoucos U.S. Pat. No. 3,382,841, or Selsam, et al., U.S. Pat. No. 3,461,910, modulates the pressurized fluid which is applied to the driver 42 in response to applied electrical control signals. The amplifier 44 may alternatively be a hydraulic servo valve of the type commonly used in many hydraulic control systems. The driver 42 converts these pressure variations into oscillatory motion of the radiator discs 20 and 22, such motion being an amplified replica of the electrical control signal input.

The hydraulic driver 42 is a pentagonal block 54 having coaxial central bores 56, 58, and 59, which define cylinders in which the radiator disc drive posts 35, 37 and 39, 41 can oscillate. The modulated pressurized fluid as from the output cavity (say the cavity identified by reference numeral (4) in the above referenced Selsam, et al., patent) enters via a channel 62 into the cavity 60 in the central bore 56 defined by the ends 47 and 49 of the inner posts 37 and 41. The outer bores 58 and 59 extend part way into the block 54 and define steps 61 and 63 opposed to the steps 43 and 45 on the outer posts 35 and 39. Cavities 64 and 66 are defined in the bores 58 and 59 between the steps 43 and 61 and the steps 45 and 63, respectively. The cavities are in communication with each other via channels 68 and 70.

When pressure increases in the drive cavity 60, the drive posts 37 and 41 located within the bore 56 are forced apart. These inner posts 37 and 41 are in constant contact with the outer posts 35 and 39 which are attached to or biased against the radiator discs 20 and 22. The posts are solid, cylindrical blocks which transmit and distribute the driving forces. These forces are applied, via the drive areas at the end faces 47 and 49, to the radiator discs 20 and 22. The drive posts have freedom of reciprocating movement within the bores 56, 58 and 59. The drive areas are the areas of the end faces of the posts (in effect pistons) on which the pressurized fluid acts.

The cavities 64 and 66 are variable volume cavities in which the volume is a function of the amount of deflection of the radiators 20 and 22. As the radiators oscillate in a direction perpendicular to a vertical plane in FIG. 3, the posts 35 and 39 and their steps 43 and 45 which define these cavities, also oscillate in the same plane thereby changing the volume of the cavities 64 and 66. These cavities 64 and 66 provide the means for coupling inertance to the hydraulically driven radiator discs 20 and 22 and to provide the inertance with the value thereof which affords such operational bandwidth as is desired.

Cavities 64 and 66 are in communication with inertance tubes 72 and 74 which are arranged spirally in the housing 24. While two tubes 72 and 74 are shown one or more may be used, depending upon the value of inertance desired. Only the tube 72 is shown in full to simplify the illustration. The free ends of the tubes are connected to gas filled (precharged) accumulators 76. The tubes 72 and 74 are filled with the hydraulic fluid and are relatively long (e.g., 70 inches for a transducer having 44 inch diameter radiator discs 20 and 22) to minimize the effects of termination impedance presented by the accumulators. The tubes 72 and 74 enter the body 54 of the driver 42 and extend into the channels 68 and 70 which will be fluid filled as will be the cavities 64 and 66.

The accumulator 76 is charged to a predetermined pressure level which then operates to maintain a constant average pressure in both the inertance tube 72 and the cavities 64 and 66.

The steps 43 and 45 of the outer posts 35 and 39 define the inertial load areas while the ends 47 and 49 of the inner posts 37 and 41 define the drive areas. The inertance of the hydraulic fluid in the inertance tubes 72 and 74, as transformed by the inertial load area acting on each radiator, provides the same result as if greater mass were added to each radiator. In particular, the effective mass seen by each radiator is equal to the mass of the hydraulic fluid in the corresponding inertance tube multiplied by the square of the ratio of the load area to the cross-sectional area of the inertance tube. Thus, if the mass of fluid in tube 72 is 2 pounds, and the rates of the load area 43 to the cross-sectional area of tube 72 is 30:1, the effective mass presented to disc 20 is $2(30)^2$, or 1800 pounds. The inertance tube dimensions and the load areas can thus be chosen to transform a small liquid mass to a large effective mass load upon the discs to place their resonant frequencies at the desired point within the transducer pass-band, thereby to enable balanced driving forces to be obtained at the band extremes. To achieve a constant transducer output through the resonant region and to the desired band extremes, the acoustic driver 42 should be a source of constant volume velocity (a source having high internal impedance). Hydraulic valve amplifiers as described in the above referenced patents are well suited to this purpose.

The hydraulic loading technique described herein provides the means for obtaining the desired resonant frequency without the addition of large external mass to achieve the proper system operating characteristics (viz, wide band operation with a structure of limited size adapted to operate at high ambient pressures). The inertance load obtained by means of the tubes 72 and 74 is easily altered by varying the length and/or diameter of the tubes and/or the transformation ratio (viz, the area of the steps 43 and 45 to the area of the inertance tubes 72 and 74). The precharge pressure in the accumulator and the size of the accumulator are selected to provide a pressure release such that the transducer is not sensitive to depth variation. Tuning (viz, placement of the resonant frequency at the desired frequency) is obtained by selecting the tube length/diameter and/or inertial load area to place the resonant frequency at a point in the pass band which provides equal driving force at the band extremes. For example for steel radiators having an active diameter of 44 inches, center thickness of 1.56 inches and edge thickness of 0.78 inches, a pair of inertance tubes, each 6 feet long and about 1 inch in diameter, acting on an inertial load area of about 24 square inches provides a resonant frequency of about 28 Hz in water. In this example pretuning the transducer to obtain a natural resonant frequency of 28 Hz equalizes the driving force requirements at both ends of the band (20 and 100 Hz) resulting in a minimization of driving power requirements.

This hydraulic loading system allows the generator to be designed for great depth operations. Radiator disc thickness can be increased to withstand higher ambient pressures while the resonant frequency obtained by the inertance tubes and inertial load area transformation is kept constant.

The radiator's stiffness and natural frequency increases with increasing thickness. By increasing the inertial load area, the mass load acting on the radiator can be increased; thus keeping constant resonant frequency for radiators of increased thickness.

By being able to increase the thickness of the radiators the generator may be utilized to greater depths without utilizing pressure compensation means. Furthermore, the transducer is provided with mechanical motion limiting to prevent overstressing and destruction at depths greater than design depths. The strut 40 can be contoured to limit physically the inward displacement of the radiators 20 and 22 beyond safe values.

From the foregoing description it will be apparent that there has been provided an improved low frequency acoustic generator which has the advantages of broad band operation with minimum power requirements, and which does not require pressure compensation for use to substantial depths. This generator has been described for use in a deep sea environment and at low frequencies, but could be used in other fields and at higher frequencies as well. Variations and modifications in the hereindescribed generator within the scope of the invention may also present themselves to those skilled in the art. For example the inertance means may be provided by a solid member, such as a piston slidable in bearings within a shorter tube, hydraulically coupled to the drive areas of the driver 42. Accordingly, the foregoing description should be taken as merely illustrative and not in any limiting sense.

What is claimed is:
1. An acoustic transmitter comprising
 a. means for radiating acoustic energy when vibrated,
 b. driving means coupled to said means element to excite said radiating means into vibration.
 c. means for providing an acoustic inertance, and
 d. means for coupling hydraulically said inertance means to said radiating means for changing the natural resonant frequency of said radiating means whereby to reduce power required from said driving means to drive said radiating means over a given band of frequencies.

2. The invention as set forth in claim 1 wherein said inertance means is a tube filled with hydraulic fluid.

3. The invention as set forth in claim 2 wherein said coupling means includes a hydraulic transformer means in communication with said tube and said radiating means.

4. The invention as set forth in claim 3 wherein said tube is elongated, means providing a pressure release connected to one end of said tube, and said hydraulic transformer means being connected to the opposite end of said tube.

5. The invention as set forth in claim 3 wherein said radiating means is a still elastic radiating element presenting an acoustic radiating surface having a certain natural resonant frequency, a member connected to said element presenting an area smaller than the area of said surface, and said coupling means including means for providing a chamber defined on at least one side by said area of said member, said chamber being connected to said tube, whereby to lower the resonant frequency of said element from its said natural resonant frequency.

6. The invention as set forth in claim 5 wherein said member is disposed centrally of said element and said area is disposed coaxially with said surface.

7. The invention as set forth in claim 4 wherein said pressure release means is an accumulator precharged with pressurized gas.

8. The invention as set forth in claim 6 wherein said element is a flexural disc, said surface is one side of said disc and said member is a cylindrical post having successive sections of larger and smaller cross-sectional area, said post being coaxial with said disc and extending from the side of said disc opposite from said one side thereof, said area being defined by a step between said successive sections and having an area which is the difference between the area of said larger section and the area of said smaller section.

9. The invention as set forth in claim 8 wherein said driving means includes a cavity filled with pressurized hydraulic fluid, the end of said smaller area of said post defining a portion of the wall of said cavity, and means for modulating the pressure of said fluid in said cavity at a frequency of the acoustic energy to be radiated.

10. The invention as set forth in claim 9 wherein said modulating means includes means for providing a source impedance which is high compared to the driving point impedance presented by said cavity.

11. An acoustic transmitter which comprises:
 a. a housing
 b. radiating elements having a natural resonant frequency mounted in said housing,
 c. hydraulic means coupled to said elements to drive said elements into oscillation,
 d. means for supplying pressurized fluid to the hydraulic means, and
 e. acoustic inertance means disposed within the path of oscillatory displacement of said elements for loading hydraulically said elements to achieve a desired resonant frequency.

12. The invention as set forth in claim 11 wherein said radiating elements are flexural discs, said discs being thickest in their center and being progressively thinner as a radius is traversed.

13. The invention as set forth in claim 12 wherein said discs are mounted back to back and said housing is cylindrical and air filled.

14. The invention as set forth in claim 13 wherein said hydraulic means is a hydraulic driver having its driving cavity located between the said discs and centered on said discs, said cavity being filled with pressurized fluid for the excitation of said radiators.

15. The invention as set forth in claim 13 wherein said acoustic inertance means includes a first hydraulic fluid filled chamber centerally disposed with respect to both discs and located between said discs.

16. The invention as set forth in claim 15 wherein said first fluid filled chamber is a variable volume chamber connected to the said radiators in such a manner that its volume is dependent on the relative radiator displacements.

17. The invention as set forth in claim 16 including a hydraulic fluid filled tube communicating at one end thereof with said first chamber.

18. The invention as set forth in claim 15 including a first hydraulic fluid filled tube having opposite ends and presenting high acoustic inertance between its ends, a precharged gas accumulator, said fluid filled tube communicating at one of said ends thereof with said first fluid filled chamber and at the other of said ends thereof with said precharged gas accumulator.

19. The invention as set forth in claim 18 including a second hydraulic fluid filled tube having opposite ends and presenting high acoustic inertance between its ends and a second precharged gas accumulator, said second tube communicating with said first fluid filled chamber at one of its said ends and said second precharged gas accumulator at the other of its said ends.

20. The invention as set forth in claim 17 including members extending in opposite direction from said discs and having first and second areas which are opposed to each other to define said first chamber, and second and third areas which are opposed to each other to define a second chamber, and means for providing acoustically modulated pressure in said second chamber for vibrating said discs, and the surface area presented by the side of each of said discs being much larger than each of said first, second, third and fourth areas.

* * * * *